Figure 1:
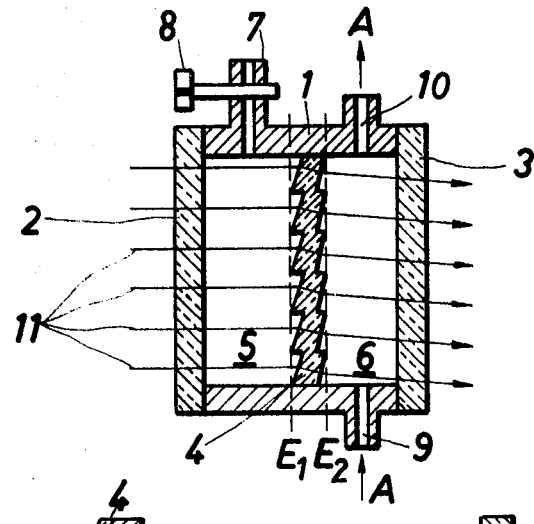

United States Patent

[11] 3,612,697

| [72] | Inventor | Wolfgang Nebe<br>Jena, Germany |
|---|---|---|
| [21] | Appl. No. | 831,285 |
| [22] | Filed | June 6, 1969 |
| [45] | Patented | Oct. 12, 1971 |
| [73] | Assignee | Jenoptik Jena GmbH<br>Jena, Germany |
| [32] | Priority | Dec. 9, 1968 |
| [33] | | Germany |
| [31] | | P 18 13 497.9 |

[54] DIFFERENTIAL REFRACTOMETER CELL
3 Claims, 4 Drawing Figs.

[52] U.S. Cl. .................................................. 356/130,
250/218, 356/208, 356/246
[51] Int. Cl. .................................................. G01n 21/46,
G01n 21/06, G01n 1/10

[50] Field of Search ............................................ 356/128–132,
208, 246; 250/218

[56] References Cited
UNITED STATES PATENTS

| 2,686,454 | 8/1954 | Ruska .......................... | 356/246 |
| 2,741,942 | 4/1956 | Svensson ..................... | 356/246 Y |
| 2,771,149 | 11/1956 | Miller et al. ................. | 356/131 X |
| 2,810,315 | 10/1957 | Miller .......................... | 356/246 |
| 2,837,007 | 6/1958 | Crawford .................... | 356/246 |

*Primary Examiner*—Ronald L. Wibert
*Assistant Examiner*—Warren A. Sklar

ABSTRACT: A differential cell includes at least one stepped partition. The partition wall is transparent, and the windows of the cell may be Fresnel lenses.

PATENTED OCT 12 1971    3,612,697

INVENTOR

BY [signature]

ATTORNEY

DIFFERENTIAL REFRACTOMETER CELL

This invention relates to differential refractometer cells comprising two diametrically opposed windows for the passage of a light beam and at least one transparent plane-parallel partition which is located between and inclined relatively to the windows, the cells being of the kind used in particular for continuous measurement of concentrations of liquids or gases by observation of the diffractions due to differences in refractive indices. These cells, known as differential cells, contain a standard medium on the one side of the partition and a test medium on the other, both media being traversed by the same beam of light.

The measuring sensitiveness of the cells is the greater the inclination of the partition or partitions relative to the two windows, which are mostly parallel to one another. The greater the inclination of the partition, the greater will be the length of the cell, the more complicated the technology of the manufacture of the cell, and the more unsatisfactory the flow of the test medium. Measurement of highly absorbent media is thus made impossible. Attempts at obviating these disadvantages have been directed towards reducing the dimensions of the cell. Apart from the facts that the length even of small cells is too great for the examination of highly absorbent media and that conditions are adverse to good flowing of the test medium, the quantity of light traversing the cell will be insufficient if the cross section of the light beam through the cell is not reduced by additional optical means.

The present invention aims at obviating the foregoing disadvantages by providing a highly sensitive differential refractometer cell of short constructional length and technologically easy manufacture in which no inclined plane-parallel plate is used as partition between the standard medium and the test medium, and in which the traversing light is sufficiently bright for the measurement of highly absorbent media without the use of additional optical means.

Figure 4:

To this end the present invention consists in a differential refractometer cell, wherein the partition is stepped, each step of said partition having two optically active faces and two optically inactive faces, said active faces being parallel to one another and at an angle to the light rays and in optical alignment for parallel displacement of the light rays. The compactness thus contrived does not impair the sensitiveness of the cell. The resultant smaller volume of the cell signifies smaller quantity of standard medium, quicker exchange of test medium, and better detection of momentary fluctuations of the test medium. Thinness of the stepped wall ensures rapid temperature balance between standard medium and test medium. Series arrangement of a plurality of stepped walls provides a plurality of prismatically active chambers in the cell and thus increases the measuring sensitiveness. The sensitiveness depends on the angle at which the beam of light strikes the partition wall, and it can therefore be increased by shaping at least one of the windows as a deflecting Fresnel lens. The differential cell of the invention is easy to manufacture because the partition comprises marginal portions in the form of a circular cylinder at at right angles to its greatest dimension. In order that the invention may be more readily understood, reference is made to the accompanying drawing, which illustrates diagrammatically and by way of example two embodiments thereof, and in which FIG. 1 is an embodiment of a bipartite differential cell,
FIG. 2 is part of a partition wall,
FIG. 3 is an embodiment of a tripartite differential cell, and
FIG. 4 is a particular form of window.

Figure 2:
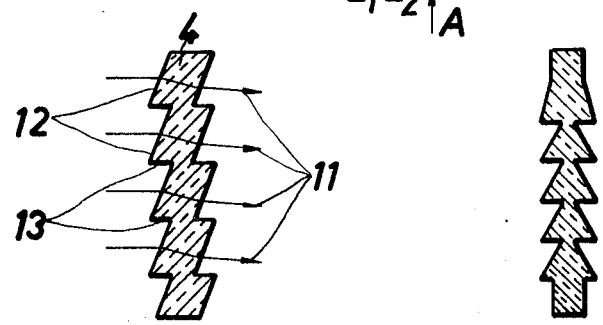

In FIG. 1 of the drawing, a sample cell 1 has two windows 2 and 3 and a stepped partition wall 4 which separates two chambers 5 and 6 from one another. The wall 4 is considered to be a plane-parallel plate which is inclined relatively to the windows 2 and 3, but has been cut up into portions of approximately equal lengths, these portions having subsequently been joined together between two planes $E_1$ and $E_2$ in such a manner that they all retain the inclination of the imaginary whole plate. The chamber 5 is filled with standard liquid or gas through a tube 7 containing a stop cock 8. Two apertures 9 and 10 in the cell 1 are for the passage of test liquid or gas through the chamber 6 in the direction of the arrows. A bundle of parallel light rays 11 traverse the cell 1, the windows 2, 3 and the wall 4 subjecting them to at most a parallel displacement. The rays 11 strike the optically active faces 12 of the wall 4 (FIG. 2) at an angle other than 90° and are at the moment of impact substantially parallel to the optically inactive faces 13. The prismatic form of the chamber 6 causes the rays 11 to be deflected at an angle that depends on the difference between the refractivity of the standard medium and that of the test medium.

Figure 3:
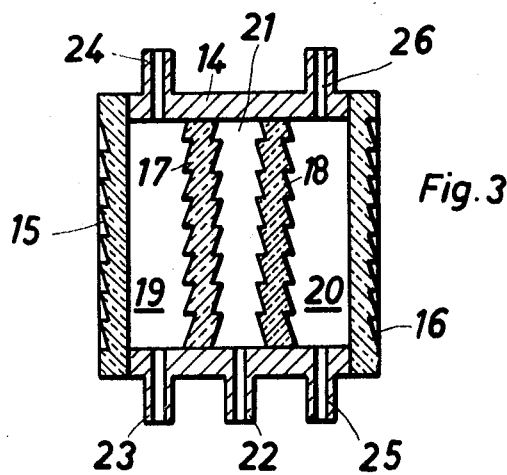

FIG. 3 illustrates a sample cell 14 comprising two windows 15 and 16, which are opposed to one another, and two stepped walls 17 and 18 which divide it into two chambers 19 and 20 for the test medium and a chamber 21 for the standard medium. The windows 15 and 16 are stepped in Fresnellike manner on the sides facing away from each other. Light rays entering for example through window 15 are displaced parallel to themselves by the windows 15, 16, as they are also by the walls 17 and 18 if the three chambers 19, 20 and 21 all contain the same medium. If the chamber 21 is filled with standard medium and the chambers 19 and 20 with test medium, or vice versa, the rays are so deflected that they strike the active faces of the wall 17 at an angle as near as possible to 90° and are substantially parallel to the inactive surfaces of the wall 17.

The chamber 21 is filled and emptied through a tube 22. The passage through the chambers 19 and 20 is effected respectively by means of tubes 23, 24 and 25, 26.

Fresnel structure may be on the interfacing sides or on the same sides of the windows 15 and 16. Each window may have Fresnel structure on both sides as shown in FIG. 4. It is also possible to have Fresnel structure on one or both sides of only one of the windows 15 and 16. Transparency is the only condition to be satisfied by the material of the windows and the stepped wall or walls. If the second window 3 or 16 is silvered, the cell of the invention can be used also in autocollimation ray paths.

I claim:

1. A differential refractometer cell for measuring concentrations of liquids or gases, comprising at least two sealed chambers with respective inlet and outlet means connected to each chamber,
   a transparent partition separating said two chambers,
   said transparent partition having a plurality of steps,
   first and second windows, one window in each of said chambers aligned to permit a light beam of parallel rays to pass along an axis through the first window into the first chamber and through the transparent partition into the second chamber and subsequently out of the cell via the second window,
   each step of the stepped partition having two optically active faces and two optically inactive faces,
   said active faces being parallel to one another and at an angle to the rays and said axis and in optical alignment for parallel displacement of the rays.

2. A cell as claimed in claim 1, wherein said optically inactive faces are positioned substantially at right angles to said windows.

3. A cell as claimed in claim 2, wherein at least one of said windows in a Fresnel lens.